(12) United States Patent
Sherwood

(10) Patent No.: US 6,355,339 B1
(45) Date of Patent: Mar. 12, 2002

(54) MECHANICALLY SECURED FOAM CORE REINFORCEMENT

(75) Inventor: Kent Sherwood, Malibu, CA (US)

(73) Assignee: Foam Matrix, Inc., Inglewood, CA (US)

( * ) Notice: Subject to any disclaimer, the term of this patent is extended or adjusted under 35 U.S.C. 154(b) by 0 days.

(21) Appl. No.: 09/617,866

(22) Filed: Jul. 17, 2000

(51) Int. Cl.[7] .............................. B32B 5/14; B32B 7/08; B29C 67/00

(52) U.S. Cl. ................... 428/309.9; 428/306.6; 428/307.3; 428/319.1; 428/76; 428/223; 264/46.7; 442/224

(58) Field of Search .................. 428/309.9, 306.6, 428/307.3, 319.1, 76, 223; 442/224; 264/46.7

(56) References Cited

U.S. PATENT DOCUMENTS

| | | | |
|---|---|---|---|
| 4,130,614 A | * 12/1978 | Saidla | .................. 264/46.4 |
| 4,510,105 A | 4/1985 | Sherwood | |
| 4,664,974 A | 5/1987 | Sherwood | |
| 4,797,312 A | 1/1989 | Sherwood | |
| 4,857,380 A | 8/1989 | Sherwood | |
| 5,928,772 A | * 7/1999 | Shiraishi et al. | .......... 428/297.4 |

* cited by examiner

Primary Examiner—Blaine Copenheaver
Assistant Examiner—Hai Vo
(74) Attorney, Agent, or Firm—Leon D. Rosen

(57) ABSTRACT

An article such as an airfoil that is of light weight and high bending strength, includes a primarily foam core part (20), fibrous strengthening layers (22, 24) at the top and bottom of the core part with the strengthening layers held by threads (64, 72) sewn through the combination, and with resin (32) forced into spaces between the fibers of the strengthening layers and forming smooth surfaces at the top and bottom of the article. The core part includes a thick body (40) of light weight foam (42) and top and bottom reinforcing layers (44, 46) lying against the top and bottom of the body, with the reinforcing layers each having spaces or pores that are filled with foam that is integral with the foam of the body. The moderate strength near the surfaces of the core part, enable the core part to resist crushing of the light weight foam during sewing of the threads and can resist pullout of fasteners that project only partially into the core part.

11 Claims, 3 Drawing Sheets

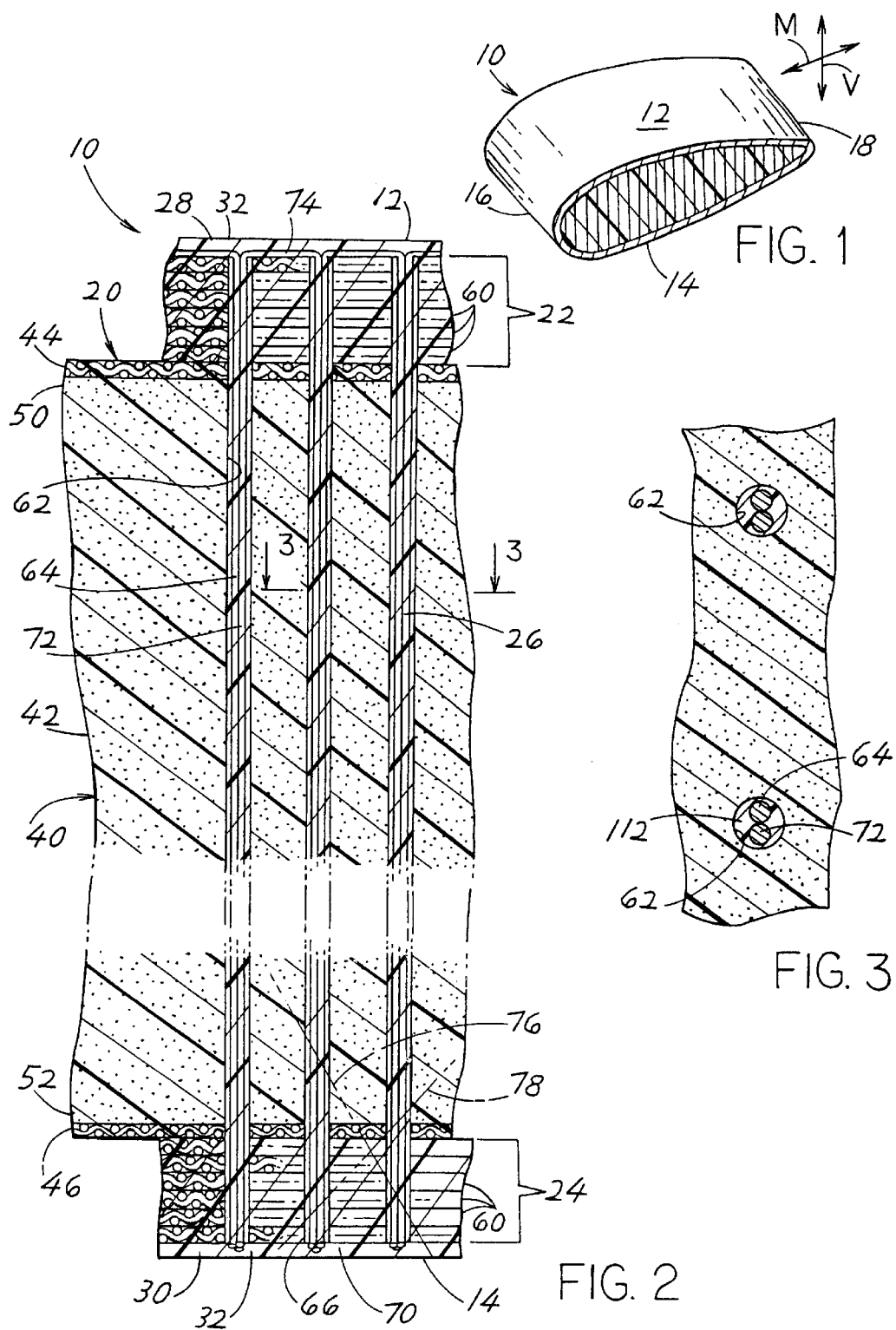

MECHANICALLY SECURED FOAM CORE REINFORCEMENT

BACKGROUND OF THE INVENTION

Articles such as airfoils must be of light weight and have a high resistance to bending. This is accomplished by providing top and bottom surface regions that have high tensile and compression strength and by providing material below the surface that will stabilize the surface regions as by supporting them against column-type collapse when under compression. In addition, the surfaces of the articles generally must be smooth. A light weight article with surfaces that were smooth or of closely controlled surface texture and that was highly resistant to bending, would be of value.

SUMMARY OF THE INVENTION

In accordance with one embodiment of the present invention, an article such as an airfoil is provided, which is of light weight and high bending strength, and which has surfaces that are smooth or of closely controlled texture. The article comprises a core part that includes a body of foam and reinforcing layers at the surfaces of the body, with the reinforcing layers having pores or spaces penetrated by foam that is integral with the foam of the body. Upper and lower strengthening layers that include multiple fibers, lie at the top and bottom surfaces of the core part. A plurality of fastener parts such as threads, extend through the strengthening layers and the reinforcing layers of the core part, and preferably through the entire combination of core part and strengthening layers at its opposite surfaces, to hold them together. A resin penetrates the pores or spaces of the strengthening layers and forms a smooth or closely controlled texture surface of the article.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric sectional view of a portion of an airfoil constructed in accordance with one embodiment of the present invention.

FIG. 2 is a partial sectional view of the airfoil of FIG. 1.

FIG. 3 is a sectional view taken on line 3—3 of FIG. 2.

DESCRIPTION OF THE PREFERRED EMBODIMENTS

Figure 7:
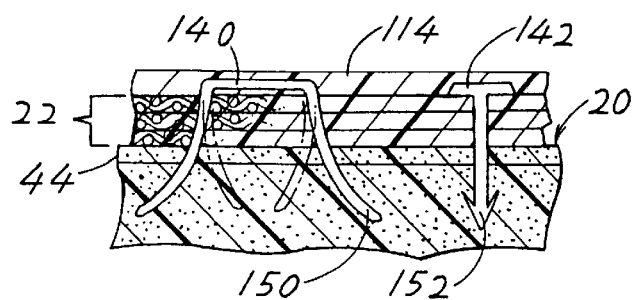
FIG. 7 is a partial sectional view of an article of another embodiment of the invention, where the fastening is accomplished by staples and rivets.

FIG. 1 illustrates an article 10 that is an airfoil having top and bottom surfaces 12, 14 spaced in vertical directions V and front and rear ends 16, 18 spaced in longitudinal directions M. It can be appreciated that the airfoil, such as a wing, elevator, or vertical stabilizer, must be of light weight, have high resistance to bending, and have smooth surfaces.

FIG. 2 shows a portion of the airfoil of FIG. 1. The airfoil includes a core part 20, upper and lower strengthening layers 22, 24 lying above and below the core part, mechanical fasteners in the form of threads 26 that hold the strengthening layers to the core part, and quantities 28, 30 of resin 32 that impregnates the strengthening layers and that forms the surfaces 12, 14 of the airfoil. The core part 20 includes a body 40 of foam 42, such as polyurethane foam having a density of about 2 lbs./ft.$^3$, and reinforcing layers 44, 46 at the top 50 and bottom 52 of the body. The foam 42 that forms the body, also penetrates pores or spaces in the reinforcing layers 44, 46, with the foam in the reinforcing layers and the body being integral. The reinforcing layers 44, 46 are preferably formed of fibers, such as a woven sheet of fiberglass, with the foam expanding through the reinforcing layers and having a higher density there. This type of core part is described in my earlier U.S. Pat. No. 4,664,974, and with a honeycomb structure in the body in my earlier U.S. Pat. No. 4,857,380.

Although the core part 20 is itself useful for certain airfoils and other articles, especially when sanded and coated with a finishing surface, there are applications that require much higher bending strength. Applicant achieves a higher bending strength and greater overall strength, by the addition of the strengthening layers 22, 24 and the resin 32.

The strengthening layers 22 are shown as including six sheets 60 of woven or matte fibers, such as fiberglass, with the pores or spaces between adjacent fibers being left empty. These sheets 60 are laid on the core part 20 and on each other to form a corresponding strengthening layer. The strengthening layer is held in place by the mechanical fastener 26.

The particular mechanical fastener 26 includes a thread of material which is threaded through the entire thickness of the combination of core part and strengthening layers. This can be accomplished by a large industrial sewing machine with a large overhanging foot that compresses the strengthening layers against the core part, while projecting a needle through all of them. The needle forms holes 62 and drags a thread portion 64 through the hole to the bottom of the combination where the lower end 66 of the thread portion is tied by a bobbin thread 70. The needle is pulled upwardly out of the hole and while laying a second thread part 72 in the hole, the needle then dragging a top thread part 74 to a next hole. It is possible to sew threads that extend an angle to the vertical, such as threads indicated at 76 and 78.

Figure 5:
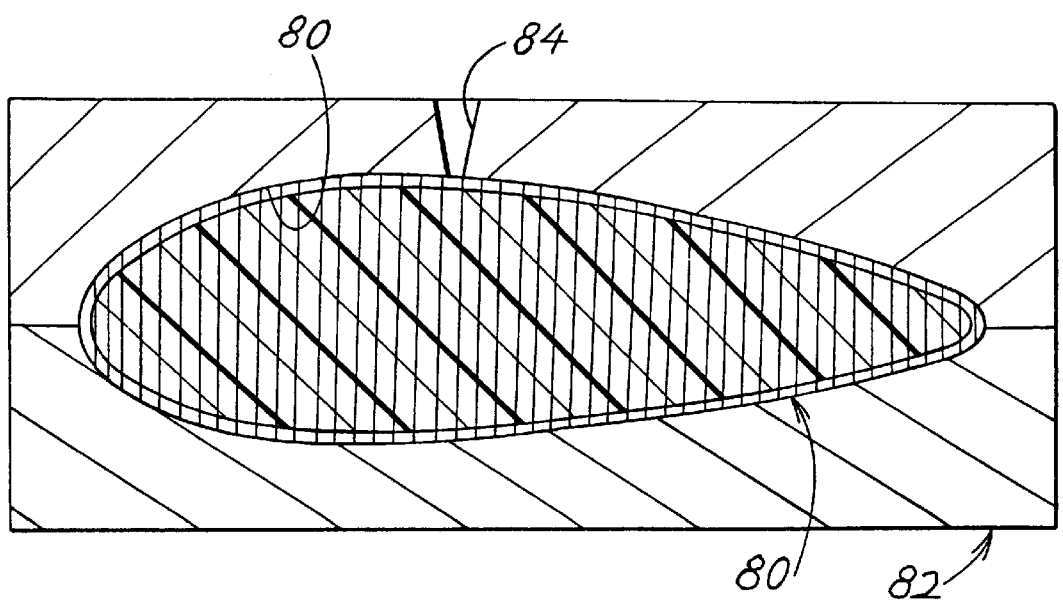
FIG. 5 is a sectional view of the article of FIG. 1 shown partially constructed and lying in an injection mold.

After the strengthening layers 22, 24 have been mechanically fastened to the core part 20, applicant injection molds the resin 32. As shown in FIG. 5, this is accomplished by placing the fastened combination 80 of the core part, strengthening layers, and fasteners formed by thread portions, in a mold 82 that fits closely around the combination. Then, a resin such as an epoxy resin, is injected through a sprue hole 84 into the mold. The epoxy fills all the spaces or pores of the strengthening layers and adheres to the top and bottom surfaces of the core part. When the resin hardens, it ties together the fibers of the strengthening layers and forms a smooth and hard surface of the airfoil. It is noted that in some cases a particular textured surface is required, which is accomplished by appropriately texturing the inner surfaces 86 of the mold as by attaching textured sheets to it.

Figure 4:
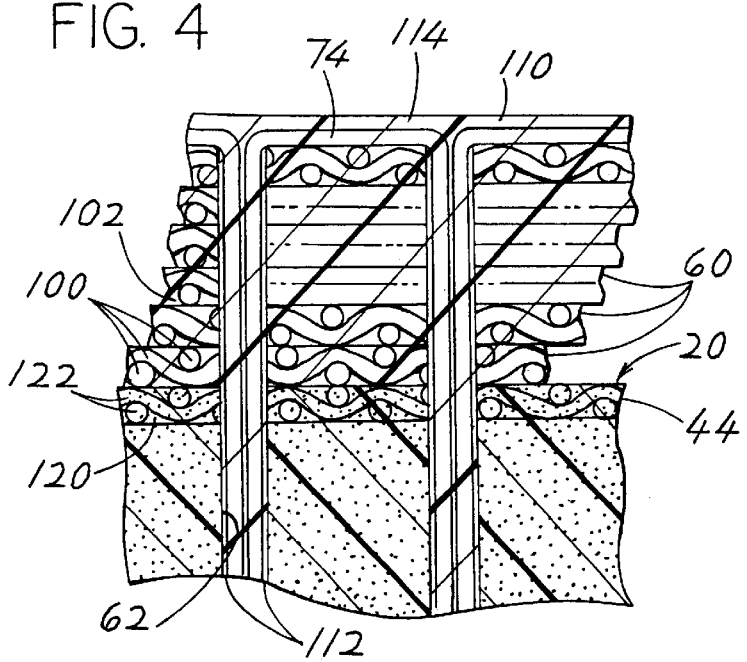
FIG. 4 is an enlarged sectional view showing a portion of the airfoil of FIG. 2.

FIG. 4 shows that each of the particular sheets 60 of the upper strengthening layer 22 includes strengthening fibers 100. The particular sheets illustrated are woven fiberglass sheets, although a matte (not in a regular pattern) pattern of fibers can be used for each sheet. The spaces 102 between the fibers are filled with resin that has flowed into the spaces under pressure and which has hardened, thereby holding the several sheets together and adhering the lowermost sheet to the top of the core part 20. The resin also forms a thin layer 110 at the top and bottom of the article. The layer can be made to lie at the level of the top thread parts 74 or slightly higher as is illustrated. The resin impregnated and coated strengthening layers 114, which each include a set of sheets 60 and the resin that impregnates them and lies at the surface of the article, is much thinner than the core part 20, usually being less than one-twentieth the thickness of the core part.

The resin preferably penetrates into the holes 62 to form a resin portion 112 in each hole. FIG. 3 shows the resin portion 112 in each hole, that surrounds the thread portions 64, 72 that lie in the hole. When the needle is thrust through the strengthening layers and core part, it leaves a hole in the shape of the needle, which may be of round cross section. The two thread portions 64, 72 lying in the holes do not occupy the entire hole, which leaves room for the resin portions 112 that lie in the holes. The resin portions help strengthen the article against compression or expansion between its top and bottom ends. However, it should be noted that most of the stresses on an airfoil occur from bending, which results in tension near one surface of the article and compression at the opposite surface. While the core part 20 is shown as also including a reinforcing layer 44 of woven fiberglass with spaces 120 between fibers 122, and with the fibers reinforced by foam lying in the spaces, the strength of the core part is much less than the strength of the final article of the present invention. This is partially due to the fact that the foam that impregnates the fibers 122 of the reinforcing layers of the core part, has only a low strength itself due to its low density of an average of no more than 8 lbs./ft.$^3$. The resin 114 (density such as 80 lbs./ft.$^3$ that penetrates the pores of the sheets 60 of each strengthening layer, itself adds considerable strength to the fibers, as well as providing a surface that can be used by itself or with only a thin coating. It is noted that in some cases the entire surface may be smoothed, although this is usually not necessary. The resin does not penetrate substantially into the core part because the core part is filled with foam.

During sewing of the thread 26, considerable localized compression force is applied to the core part 20, as by the foot of a sewing machine, and by a needle as it penetrates the core part. Downward tension force is applied as the needle emerges from the bottom of the core part. If the reinforcing layers 44, 46 with denser foam were not present at the surfaces of the core part, the upper surface could be permanently compressed, while the lower surface could have small chunks pulled or pushed out. The reinforcing layers and denser foam thereat also add bending strength to the airfoil.

Figure 6:
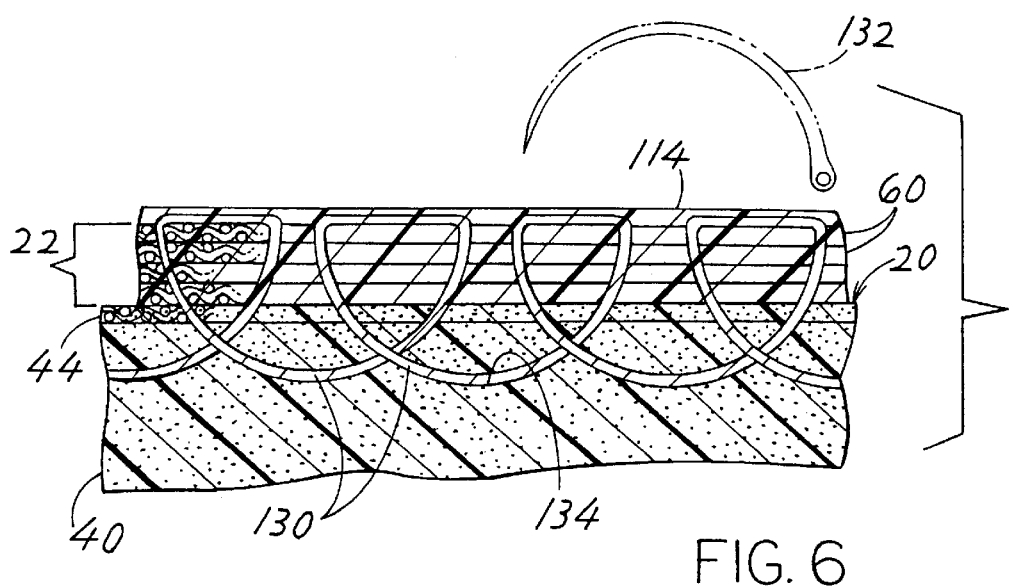
FIG. 6 is a partial sectional view of an article constructed in accordance with another embodiment of the invention, where the fastening is by surface area stitches.

FIG. 6 illustrates another embodiment of the invention, where the sheets 60 of the strengthening layer 22 are initially held to the core part 20 by thread portions 130 that are sewn in curved paths, as by a curved needle 132. The curved needle does not penetrate far into the foam body 40 of the core part, but projects below the top reinforcing layer 44. The resin 114 penetrates through the strengthening layer 22 and adheres to the top of the core part. However, the resin may or may not pass through holes 134 that contain the threads, depending upon the shape and size of the needle as compared to that of the thread portions.

FIG. 7 illustrates two other embodiments of the invention, where the same strengthening layer 22 and core part 20 are used, but where staples 140 and/or rivets 142 are used to hold each strengthening layer to the core part, with resin 114 penetrating pores in the reinforcing layer and forming the surface. As in FIG. 6, lower ends 150, 152 of the fastener extend below the strengthening fiber layer 44 of the core part.

In an airfoil of the construction shown in FIGS. 1–5 that applicant has designed, the foam 42 (FIG. 2) has a density of about 2 lbs./ft.$^3$ in the body 40 and has a density about three times as great in the top and bottom reinforcing layers 44, 46. A body foam density below 8 lbs./ft.$^3$ is desirable to minimize the weight of the article. Each of the reinforcing layers was formed of woven fiberglass having a thickness of about 7 mils (one mil equals one thousandth inch) and a weight of 4 oz./yd.$^2$. Six sheets 60 were used for each strengthening layer 22, 24, with each sheet having a thickness of about 10 mils and a weight of 5 oz/yd.$^2$. An epoxy resin was used to fill the pores of the strengthening layers 22, 24, to adhere them to the core part, and to form the surface of the article. The core part 20 had a thickness of about 8 inches and the resin impregnated and coated strengthening layers each had a thickness of about 0.1 inch. The resin impregnated and coated strengthening layers extended around the front and rear of the airfoil.

While terms such as "upper", "lower", etc. have been used to help describe the invention as illustrated, it should be understood that the article can be used in any orientation with respect to the Earth.

Thus, the invention provides an article of light weight and high bending strength. The article comprises a core part that includes a quantity of foamed and hardened foam, with the core part including a body of such foam and reinforcing layers at the top and bottom of the body with each layer having multiple fibers with foam that is integral with the foam of the body penetrating the pores between fibers of the reinforcing layers. Upper and lower strengthening layers formed of multiple fibers that are preferably of a woven but possibly of a matte construction lie against the top and bottom of the core part The strengthening layers are preferably fastened to the core part, as by threads projecting through the entire thickness of the combination of core part and strengthening layers. Top and bottom quantities of hardened resin lie in the spaces between strengthening fibers and adhere to a corresponding surface of the core part, with the resin forming a corresponding upper or lower surface of the article. The resin preferably extends through holes in the core part formed around fastening threads or other fasteners. The resin quantities form surface portions of the article, in that they may form the surface or there may be a coating on the resin.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An article of light weight and high bending strength, comprising:

a core part comprising a quantity of with said foam forming a body having top and bottom ends, and top and bottom reinforcing layers lying respectively above and below said body top and bottom ends, with each of said reinforcing layers constructed of multiple fibers with said foam penetrating pores between said reinforcing fibers and with the foam lying in said pores being integral with the foam in said body;

upper and lower strengthening layers of multiple fibers lying respectively above and below said core, with said layers forming spaces between said strengthening fibers;

top and bottom quantities of hardened resin that lies in said spaces between strengthening fibers and that adheres to one of said core part ends, with said quantities forming upper and lower surface portions of said article.

2. The article described in claim 1 including:

walls forming a multiplicity of at least partially vertically extending and elongated holes projecting through said upper strengthening layer and said top reinforcing layer and into said body, and a plurality of a mechanical fasteners lying in said holes.

3. The article described in claim 2 wherein:

at least one of said quantities of hardened resin lies in said holes.

4. The article described in claim 1 including:

walls forming a multiplicity of largely vertical and elongated holes projecting through said core part and said upper and lower strengthening layers; and a multiplicity of lengths of thread, with at least one extending through each of said holes, with at least one of said quantities of hardened resin also extending through said holes.

5. An article of light weight and high bending strength, comprising:

a core part that includes a quantity of hardened foam, with said foam forming a body having a top and a bottom, with said core part including top and bottom reinforcing layers lying against said body top and bottom, respectively, with said reinforcing layers each having pores, and with said foam having portions lying in said pores and integral with the foam in said body;

upper and lower strengthening layers lying respectively above and below said core part, with each strengthening layer comprising multiple strengthening fibers with spaces between said strengthening fibers;

a plurality of fastener parts, with each fastener part penetrating one of said strengthening layers and a corresponding reinforcing layer of said core part and at least a part of said body;

upper and lower quantities of hardened resin that each lies in said spaces between said strengthening fibers of one of said strengthening layers.

6. The article described in claim 5 wherein:

said fastener parts have upper ends that lie over said upper strengthening layer, and said resin lies over said upper strengthening layer and said fastener upper ends to form a smooth even surface.

7. The article described in claim 5 wherein:

said fastener parts comprise threads that extend primarily vertically through said upper and lower strengthening layers and said core part.

8. The article described in claim 5 including:

walls forming holes in said corresponding reinforcing layer and at least part of said body, through which said fastener parts extend;

at least one of said quantities of hardened resin extends into said holes.

9. A method for forming an article of light weight and high bending strength, comprising:

forming a core part that has top and bottom ends and that includes a body of hardened foam that has top and bottom body ends and that includes a top reinforcing layer lying on said top body end with said foam lying in pores of said reinforcing layer and being integral with the foam of said body;

placing a strengthening layer of fibrous material containing fibers with spaces between fibers, against said top end of said core part;

projecting a plurality of fasteners through said strengthening layer and through said reinforcing layer, to form a mechanically secured core part with strengthening layer;

pressure molding a resin around said mechanically secured core part with strengthening layer, to force flowable resin into the spaces of said strengthening layer and against said core part top end, and to leave a smooth surface of said resin at a top of said mechanically secured core part with strengthening layer.

10. The method described in claim 9 wherein:

said step of forming a core part includes establishing a bottom reinforcing layer with pores filled with said foam;

said step of placing a strengthening layer includes placing a strengthening layer against the bottom end of the core part;

said step of projecting fasteners includes sewing a thread, including using a needle to form holes and to drag portions of a thread through the entire thickness of the combination of said core part with said strengthening layers with said thread portions left in the holes;

said step of pressure molding a resin includes molding it into and around said lower strengthening layer.

11. The method described in claim 10 wherein:

said step of pressure molding a resin includes flowing said resin into the holes that are occupied by said portions of a thread.

* * * * *

UNITED STATES PATENT AND TRADEMARK OFFICE
CERTIFICATE OF CORRECTION

PATENT NO. : 6,355,339 B1
DATED : March 12, 2002
INVENTOR(S) : Kent Sherwood

It is certified that error appears in the above-identified patent and that said Letters Patent is hereby corrected as shown below:

<u>Column 4,</u>
Line 54, after "quantity of" insert -- hardened foam --.

Signed and Sealed this

Fourth Day of June, 2002

Attest:

Attesting Officer

JAMES E. ROGAN
*Director of the United States Patent and Trademark Office*